United States Patent [19]

Kishida et al.

[11] 4,373,891
[45] Feb. 15, 1983

[54] APPARATUS FOR COOLING A TRANSFER MANDREL

[75] Inventors: Nobuhiro Kishida, Tokyo; Kunihiro Shishido; Satoshi Haryu, both of Shobu, all of Japan

[73] Assignee: Toyo Seikan Kaisha, Ltd., Tokyo, Japan

[21] Appl. No.: 278,005

[22] Filed: Jun. 26, 1981

[30] Foreign Application Priority Data

Jul. 27, 1980 [JP] Japan .................................. 55-86436

[51] Int. Cl.³ .......................... B29C 17/07; F27D 3/12
[52] U.S. Cl. .................................. 425/174.4; 264/520;
264/521; 264/535; 425/526; 425/534; 425/540;
425/445; 432/124; 432/235
[58] Field of Search ..................... 425/174.4, 526, 534,
425/540, 445; 432/124, 235; 264/520, 521, 535

[56] References Cited

U.S. PATENT DOCUMENTS

| 3,599,280 | 8/1971 | Rosenkranz et al. | 18/5 BM |
| 3,850,573 | 11/1974 | Yoshikawa et al. | 432/12 V |
| 4,214,860 | 7/1980 | Kleimenhagen et al. | 425/526 X |
| 4,233,010 | 11/1980 | Suzuki | 425/526 X |

Primary Examiner—Jan H. Silbaugh
Attorney, Agent, or Firm—Armstrong, Nikaido, Marmelstein & Kubovcik

[57] ABSTRACT

An apparatus for cooling a transfer mandrel on whose top portion a thermoplastic resin parison is mounted and which is rotatably engaged with the peripheral portion of a rotary table. The apparatus is arranged along the peripheral portion of the rotary table adapted to rotate oppositely to a heating means. The apparatus comprises a cooling block having a cavity through which cooling water flows and a concave surface opposing to the transfer mandrel which has a profile conforming to the cylindrical portion of the transfer mandrel, means for adjusting the position of the cooling block, and a spring which pushes a surface portion opposite said concave surface of the cooling block.

11 Claims, 8 Drawing Figures

APPARATUS FOR COOLING A TRANSFER MANDREL

BACKGROUND OF THE INVENTION

The present invention relates to an apparatus for cooling a transfer mandrel, and more particularly is directed to a cooling apparatus provided on a parison heating station for prevention of the temperature rise in a transfer mandrel on which is mounted the thermoplastic resin parison for blow molding or draw-blow molding of hollow articles.

Figure 1:
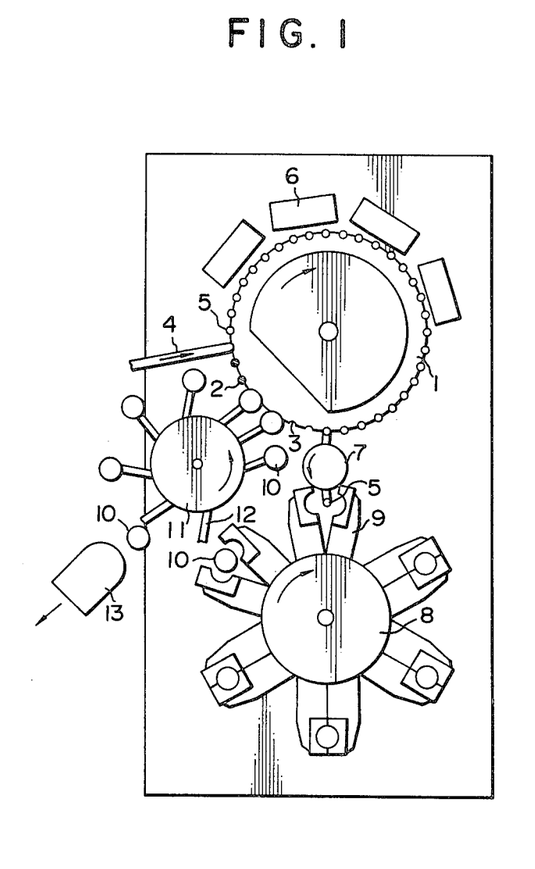
FIG. 1 is a plan view illustrating an example of a hollow article molding machine to which the apparatus according to this invention is applied.

A draw-blow molding apparatus for making thermoplastic resin hollow articles of a type as illustrated in FIG. 1 is proposed in Japanese Laid-Open Patent Publication No. 93062/1979 or U.S. patent specification No. 4,214,860. In equi-spaced relationship along the periphery of a rotary heating table 1 a plurality of supporting portions 3 for transfer mandrels 2 are provided as indicated in FIG. 1. A parison 5 having a bottom is conveyed in the arrow direction by means of a conveyor 4, mounted on the top portion of the transfer mandrel 2 at the leading end portion of the conveyor 4, and heated to a draw-blowable temperature by means of an infra-red radiation heating means 6 while transferred in the arrow direction along with the rotary heating table 1. Subsequently the parison 5 riding on the transfer mandrel 2 is fed by means of a transfer table 7 to a draw-blow molding mold 9 provided on a molding table 8 rotating in the arrow direction, and molded thereon to a hollow article 10 having a predetermined shape. The hollow article 10, while it is transferred to an arm 12 provided on a rotary discharge table 11 together with the transfer mandrel 2 and travels in the arrow direction, is separated from the transfer mandrel 2 and delivered to the next step via a discharge chute 13, while the transfer mandrel 2 is engaged again with the supporting portion 3 on the rotary heating table 1.

As described hereinabove, the transfer mandrel 2 is circulated repeatedly through all the stations or steps, and during its circulation the temperature of the top portion 2a (refer to FIG. 2) thereof and its vicinity increases gradually and sometimes rises over the glass transition point of the resin forming the parison 5 (e.g. linear polyester resins such as polyethylene terephthalate) by radiation heating from a reflection panel 30 (refer to FIG. 2) and heat conduction from the heated parison or the like, although the device is designed so that the transfer mandrel (2) is not heated directly by the infra-red radiation heating means 6.

The above-mentioned temperature rise causes a temperature rise at the open end portion 5a of the parison 5 in contact with the top portion 2a of the transfer mandrel 2, which poses problems such as the deformation of the open end portion 5a during the heating step and the imperfect sealing between the open end portion 5a and the transfer mandrel 2 leading to a poor formed article obtained during the blow molding or draw-blow molding step. Further, since the deformation of the open end portion 5a and the imperfect sealing described above increase with the heat capacity of the infra-red radiation heating means 6, the infra-red radiation heating means of a relatively small heat capacity has to be employed so as to alleviate the above-mentioned problems, which brings about a disadvantage that the peripheral velocity of the rotary heating table 1 must be reduced so as to assure the sufficient heating of the parison 5, thereby leading to a low productivity.

SUMMARY OF THE INVENTION

The object of the invention is to provide a cooling apparatus of the transfer mandrel used in the heating step of a thermoplastic resin parison for blow molding or draw-blow molding of a hollow article so as to prevent the transfer mandrel on which the parison is mounted from rising in temperature.

Another object of the invention is to provide a cooling apparatus of the transfer mandrel used in the heating step of a thermoplastic resin parison for blow molding or draw-blow molding of a hollow article so as to prevent the open end portion of the parison riding on the transfer mandrel from being deformed thermally.

Still another object of the invention is to provide a cooling apparatus of the transfer mandrel used in the heating step of a thermoplastic resin parison for blow molding or draw-blow molding of a hollow article so as to prevent the sealing between the transfer mandrel and the open end portion of the parison being damaged.

Further object of the invention is to provide a cooling apparatus of the transfer mandrel used in the heating step of a thermoplastic resin parison for blow molding or draw-blow molding of a hollow article which enables a high heating rate of the parison and a high productivity of the hollow article.

According to the invention there is provided an apparatus arranged along the peripheral portion of a rotary table adapted to rotate oppositely to a heating means for cooling the cylindrical portion of a transfer mandrel on whose top portion a thermoplastic resin parison is mounted and which is engaged rotatably with the peripheral portion, and comprising a cooling block having a cavity through which cooling water flows and a concave surface opposing to the transfer mandrel which has a profile conforming to the cylindrical portion, means for adjusting the position of the cooling block so that the concave surface of the cooling block may be brought into whole contact with the cylindrical portion of the transfer mandrel, and a spring which pushes a surface portion opposite the concave surface of the cooling block.

Further, according to the preferred embodiment of the invention, the heating means is an infra-red radiation heating device and the transfer mandrel having a sprocket is rotated by means of a chain which is engaged with the sprocket and travels in the opposite direction to the rotating direction of the rotary table, whereby the transfer mandrel can be rotated with an uniform velocity without slippage and the circumferentially uniform heating of the parison can be effected.

BRIEF DESCRIPTION OF THE DRAWINGS

These and other objects, advantages and features of the invention will be described in more detail with reference to the accompanying drawings in which.

DETAILED DESCRIPTION OF THE PREFERRED EMBODIMENT

Figure 2:
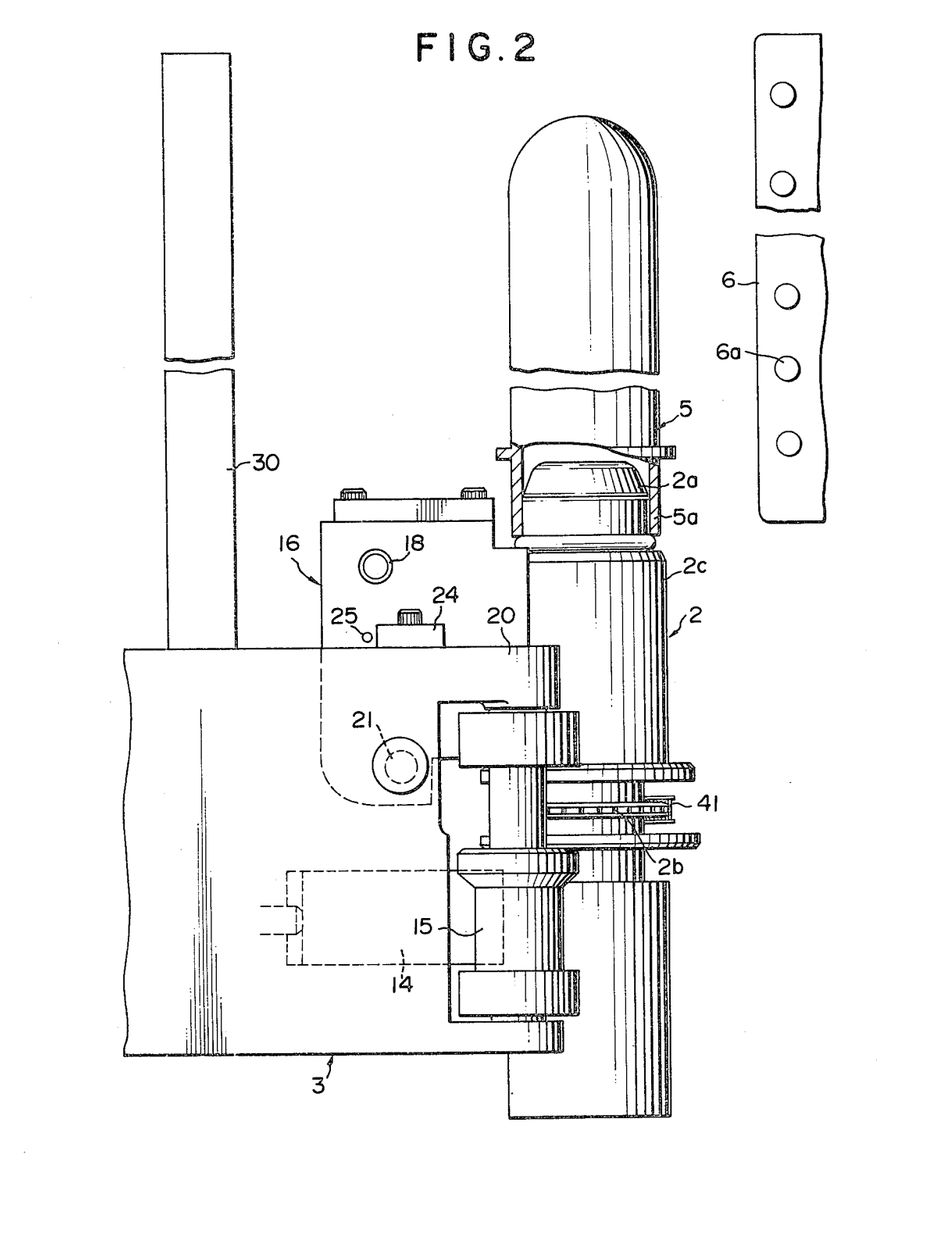
FIG. 2 is a front view of a first embodiment of the apparatus according to this invention.
Figure 3:
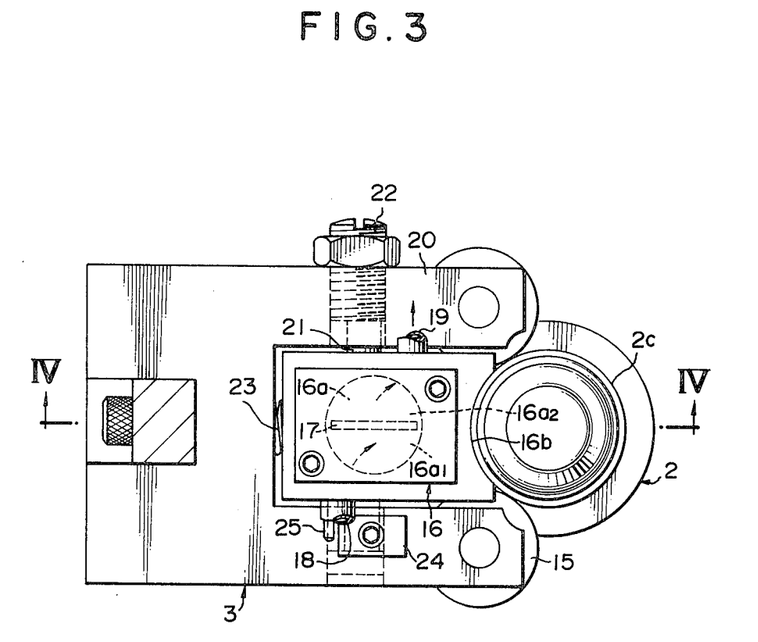
FIG. 3 is a plan view of the apparatus shown in FIG. 2.
Figure 4:
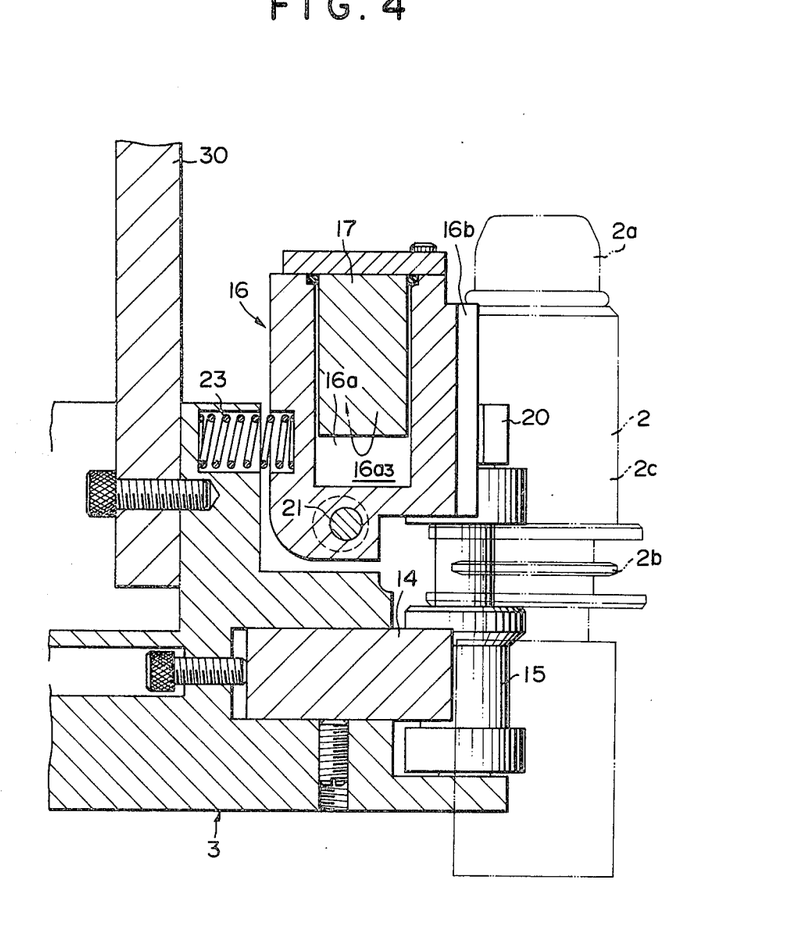
FIG. 4 is a vertical sectional view taken along line IV—IV of FIG. 3.

Referring to FIGS. 2, 3 and 4, a transfer mandrel 2 is engaged with a mandrel supporting portion 3 of a rotary table 1 which is indicated in FIG. 1. The mandrel supporting portion 3 is provided with a permanent magnet 14, a pair of rollers 15 disposed at both sides of the tip portion of the permanent magnet 14, and a cooling block 16 for cooling the transfer mandrel 2 to prevent the temperature rise thereof.

The permanent magnet 14 functions to attract the transfer mandrel 2 formed of a ferromagnetic material (e.g. ferromagnetic stainless steel) thereto and allow it to be engaged with the rollers 15. The transfer mandrel 2 is rotated together with the rollers 15 by an endless chain 41 (refer to FIG. 8) which is engaged with a sprocket 2b secured to the transfer mandrel 2, so that the parison 5 may be heated uniformly in its circumferential direction with infra-red tube heaters 6a. The driving means for the endless chain 41 will be described in detail hereinafter.

The cooling block 16 is disposed above the permanent magnet 14 to face the upper cylindrical portion 2c of the transfer mandrel 2. The cooling block 16, which is preferably formed from a metal or alloy of high heat conductivity such as aluminum or its alloys, is provided with a cavity 16a through which cooling water flows. The cavity 16a is divided into an entrance portion $16a_1$ and an exit portion $16a_2$ by a partition 17 extending in the diametrical direction such that portions $16a_1$ and $16a_2$ communicate with each other through a portion $16a_3$ beneath the partition 17, as best shown in FIG. 4. The cooling water flows in the arrow direction from an entrance pipe 18 through the entrance portion $16a_1$, the portion $16a_3$, the exit portion $16a_2$ and an exit pipe 19 so as to cool the cooling block 16.

The concave surface 16b of the cooling block 16 has a profile conforming to and of the same curvature radius of that of the upper cylindrical portion 2c of the transfer mandrel 2 so as to be able to be in whole contact with the outer peripheral surface of the upper cylindrical portion 2c. It is desirable that the concave surface 16b is coated with a smooth wear-proof film such as a hard chromium plated layer, or a film of high heat-conductivity such as silver or its alloy plated layer.

The cooling block 16 is carried rotatably on a generally U-shaped frame 20 with an eccentric pin 21, whose one end portion consists of a threaded portion 22. The cooling block 16 can be slightly moved in the horizontal and vertical directions by revolving the threaded portion 22, and thus by adjusting the threaded portion 22 the concave surface 16b can be fixed to a position where it can be in whole contact with the outer peripheral surface of the upper cylindrical portion 2c of the transfer mandrel 2.

A coil spring 23 is provided behind the cooling block 16, so that the cooling block 16 may be pushed forwardly at all times, and thus the concave surface 16b may push the outer peripheral surface of the upper cylindrical portion 2c so as to ensure the whole contact between the both surfaces. The pushing force by the coil spring 23 is set to a smaller value than the attracting force of the permanent magnet 14 to the transfer mandrel 2.

A stopper 24 is provided on the upper surface of the frame 20. In case where the transfer mandrel 2 is not engaged with the mandrel supporting portion 3, the stopper 24 is engaged with a stopper pin 25 fixed to the cooling block 16, so that the cooling block 16 may not be tilted forwardly beyond a predetermined position.

The aforementioned apparatus will be operated as follows:

Before the transfer mandrel 2 is engaged with the mandrel supporting portion 3, the cooling block 16 is tilted forwardly about the eccentric pin 21 by the action of the coil spring 23 to the position where the stopper 24 is engaged with the stopper pin 25.

When the transfer mandrel 2 is forwarded to the mandrel supporting portion 3 from the arm 12 of the rotary discharge table 11, the transfer mandrel 2 is engaged with the rollers 15 with the attracting force of the permanent magnet 14, and simultaneously the upper cylindrical portion 2c returns the concave surface 16b of the cooling block 16 to a vertical position, whereby the upper cylindrical portion 2c is brought into whole contact with the concave surface 16b. Concurrently, the transfer mandrel 2 is rotated by the endless chain 41, and the upper cylindrical portion 2c is cooled with the concave surface 16b.

The parison 5 mounted on the top portion 2a of the transfer mandrel 2 is heated with infra-red radiation heating means 6, and simultaneously the top portion 2a and its vicinity are also heated to some degree. However, the temperature rise at the top portion 2a and its vicinity is prevented by the above-mentioned cooling effect. The transfer mandrel 2, when it has reached the transfer table 7, is removed from the supporting portion 3 by means of a means not shown, and delivered to the molding table 8 via the transfer table 7.

Figure 5:
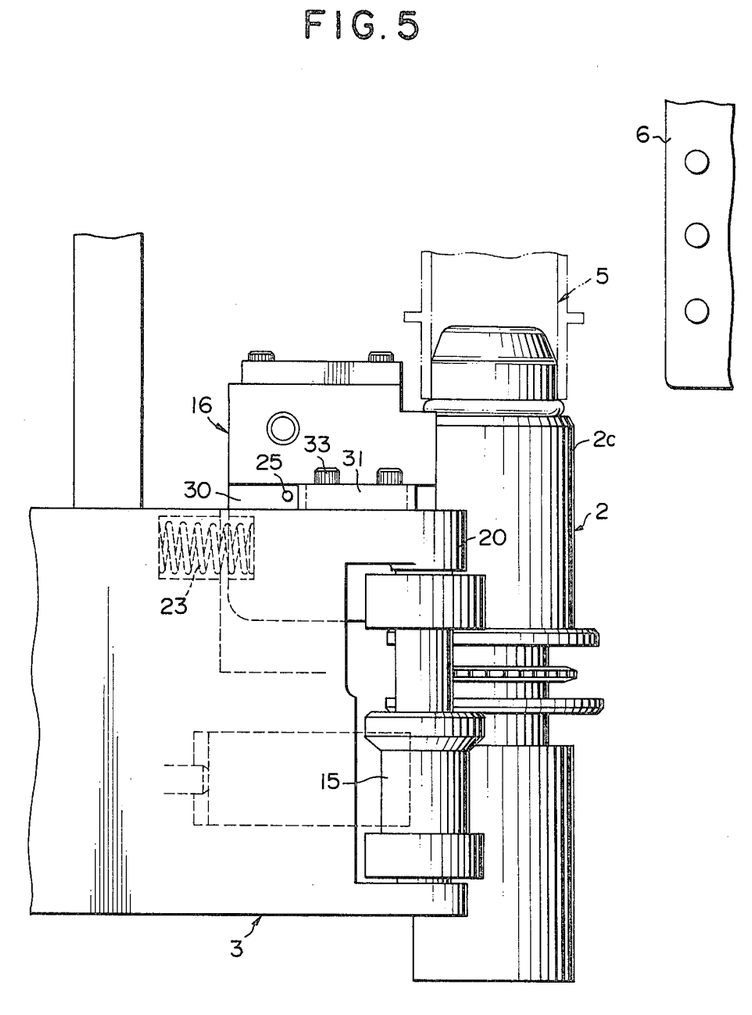
FIG. 5 is a front view of a second embodiment of the apparatus according to this invention.
Figure 6:
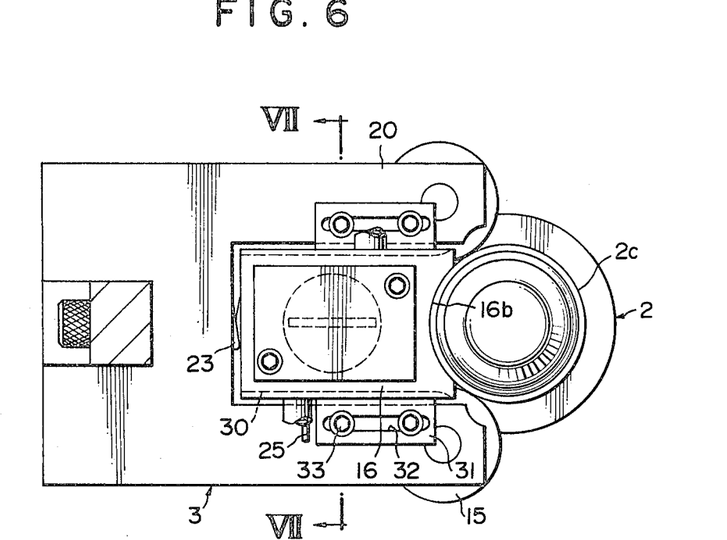
FIG. 6 is a plan view of the apparatus shown in FIG. 5.
Figure 7:
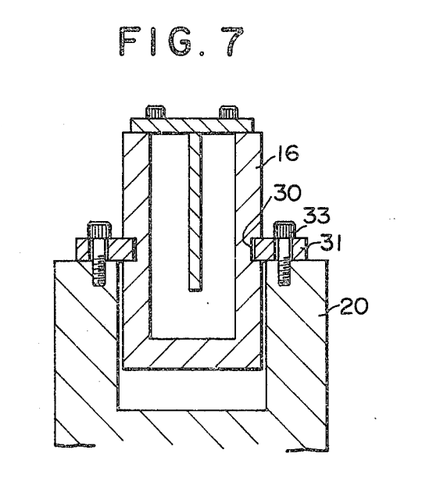
FIG. 7 is a vertical sectional view taken along line VII—VII of FIG. 6.

FIGS. 5, 6 and 7 illustrate another embodiment of this invention, wherein a sliding mechanism is used for adjusting the position of the cooling block 16 instead of the eccentric pin 21. On the both side walls of the cooling block 16 there are provided horizontal grooves 30 which extend along the upper surface of the frame 20 and in the pushing direction of the coil spring 23, and are adapted to slide along guide blocks 31 fixed to the upper surface of the frame 20. The fixed position of the guide block 31 is adjusted with a slot 32 and a screw 33.

In case where the transfer mandrel 2 is not engaged with the mandrel supporting portion 3, the cooling block 16 slides along the guide block 31 to the right side of FIG. 6 with the pushing action of the coil spring 23 to the position where the stopper pin 25 is engaged with the guide block 31. When the transfer mandrel 2 is engaged with the rollers 15, the concave surface 16b of the cooling block is brought into contact with the upper cylindrical portion 2c of the transfer mandrel 2, and simultaneously the cooling block 16 retracts to the left side of FIG. 6, as a result of which the concave surface 16b pushes the upper cylindrical portion 2c with the pushing action of the coil spring 23 to ensure the whole contact between the two.

According to the present invention, there is an advantage that the revolving transfer mandrel can be fully cooled with a large heat transmission, since the upper cylindrical portion of the transfer mandrel is brought into whole contact with the concave surface of the cooling block cooled with cooling water flowing therein by the pushing action of the spring. Further, there is another advantage that the above whole contact can be ensured easily by the adjustment with the eccentric pin of a simple structure, or the sliding mechanism.

Figure 8:
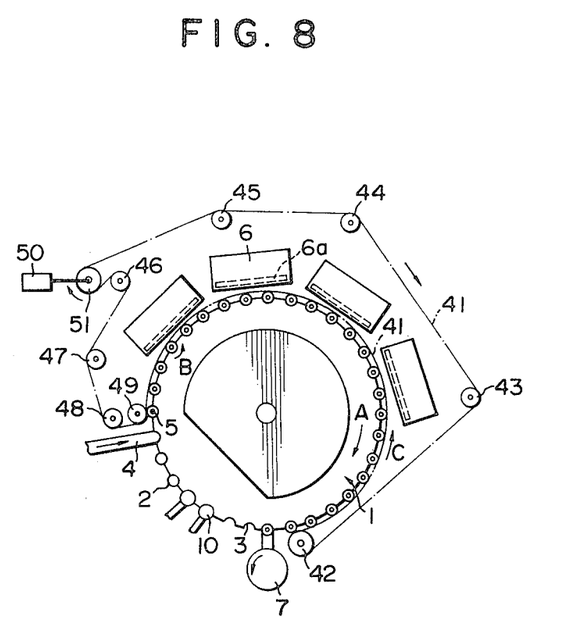
FIG. 8 is a schematic plan view illustrating an example of a means for rotating the transfer mandrel applicable to the apparatus according to the invention.

Means for rotating the transfer mandrel 2 will be described hereinbelow.

Referring to FIG. 8, the endless chain 41 which is engaged with the sprocket 2b (refer to FIG. 2) of the transfer mandrel 2 at the outer extremity thereof is arranged along guide sprockets 42, 43, 44, 45, 46, 47, 48, and 49 and a drive sprocket 51 which is driven by a variable speed motor 50 such that it travels at a predetermined speed in the opposite direction shown by the arrow C to the rotating direction shown by the arrow A of the rotary heating table 1, and along the peripheral portion of the rotary heating table 1 at least in front of the infra-red radiation heating means 6, that is, in the distance from the conveyor 4 to the transfer table 7.

The use of the endless chain 41 has an advantage that there can be completely prevented a slippage between the transfer mandrel and a fixed rope such as seen in the conventional method disclosed in the U.S. patent specification No. 4,214,860 or Japanese Laid-Open Patent Publication No. 93062/1979 which tends to occur particularly in case of using the cooling block 16 owing to the friction resistance thereof, and thus the fluctuation of rotation in the direction shown by the arrow B of the transfer mandrel 2 and the parison 5 is completely eliminated, as a result of which an uniform temperature distribution in the circumferential direction of the parison 5 is ensured.

Further, it is possible to allow the number of rotations of the transfer mandrel 2 made during travel in front of each infra-red radiation heating means 6 to be an integral number such as three times or four times by controlling the travelling speed of the endless chain 41 in case of relatively slow speeds, and thus nonuniform temperature distribution in the circumferential direction of the parison 5 can be prevented, whereas in the conventional method using the fixed rope the above number of rotations tends to be a non-integral number such as 3.4 times, which tends to lead to a non-uniform temperature distribution in the circumferential direction of the parison.

It is also easy to increase the above-mentioned number of rotations to e.g. 20 times by raising slightly the speed of the endless chain 41, since the endless chain 41 travels in the opposite direction to the rotating direction of the rotary heating table 1. In case of such a large number of rotations, the uniform heating in the circumferential direction of the parison 5 is ensured even with the number of rotations which is not an integral number.

The uniform thickness in the circumferential direction of the side wall portion of a blow molded hollow article, particularly a drawn and blown hollow article can be effected by such a uniform heating in the circumferential direction of the parison. This effect is to be noted particularly in case where the fluctuation of the temperature in the circumferential direction of the parison is required to be within ±5° C. so as to achieve the commercially allowable uniform thickness in the circumferential direction of the side wall portion of bi-axially drawn and blown hollow articles such as polyethylene terephthalate containers used for carbonated drinks, soy bean sauce and salad oil, or the like.

Furthermore, although the rotating number of the rotary heating table 1 is often changed according to the type of the product, since the speed of the endless chain is variable, the uniform temperature in the circumferential direction of the parison and thus the uniform thickness in the circumferential direction of the side wall portion of the product are ensured at all times in spite of the above change of the production speed.

What is claimed is:

1. An apparatus for cooling a transfer mandrel, said transfer mandrel including a top portion upon which a thermoplastic resin parison can be mounted, a cylindrical portion disposed beneath said top portion, and a lower portion adapted to be removeably, rotatably engaged with a peripheral portion of a rotary table, said rotary table being adapted to rotate oppositely to a heating means and including means for engaging said lower portion of said transfer mandrel, said cooling apparatus being mounted along the peripheral edge of rotary table above said means for engaging and comprising a cooling block having a cavity through which cooling water flows and a concave surface opposing said cylindrical portion of said transfer mandrel, said concave surface having a profile conforming to the cylindrical portion of said transfer mandrel, means for adjusting the position of the cooling block so that said concave surface of said cooling block may be brought into whole contact with the cylindrical portion of said transfer mandrel when said transfer mandrel is engaged, and a spring which pushes a surface portion of said cooling block opposite said concave surface, whereby the cylindrical portion of said transfer mandrel is cooled so as to prevent said top portion from rising in temperature.

2. An apparatus according to claim 1, wherein said means for adjusting the position of the cooling block comprises an eccentric pin.

3. An apparatus according to claim 1, wherein said means for adjusting the position of the cooling block comprises horizontal grooves provided on the both sides of said cooling block and guide blocks fixed to the upper surface of a frame.

4. An apparatus according to claim 1, wherein said heating means comprises an infra-red tube heater.

5. An apparatus according to claim 1, wherein said cooling block is formed of aluminum.

6. An apparatus according to claim 1, wherein said cooling block is formed of an aluminum alloy.

7. An apparatus according to claim 1, wherein said concave surface is covered with a wear-proof film.

8. An apparatus according to claim 1, wherein said thermoplastic resin parison comprises the parison for blow molding.

9. An apparatus according to claim 1, wherein said thermoplastic resin parison comprises the parison for bi-axially draw-blow molding.

10. An apparatus according to claim 1, 2, 3, or 4, wherein said transfer mandrel is adapted to rotate by means of a chain which is engaged with a sprocket secured to said lower portion of said transfer mandrel and is adapted to travel in the opposite direction to the rotating direction of said rotary table.

11. An apparatus according to claim 9, wherein said parison for bi-axially draw-blow molding is formed of a linear polyester resin.

* * * * *